(12) United States Patent
Iimure et al.

(10) Patent No.: US 12,498,812 B2
(45) Date of Patent: Dec. 16, 2025

(54) INPUT DEVICE DETECTING A TOUCH INPUT OPERATION BASED ON A PANEL TILT ANGLE

(71) Applicant: Alps Alpine Co., Ltd., Tokyo (JP)

(72) Inventors: Satoshi Iimure, Miyagi-ken (JP); Shunsuke Sato, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/497,119

(22) Filed: Oct. 30, 2023

(65) Prior Publication Data
US 2024/0061525 A1 Feb. 22, 2024

Related U.S. Application Data

(63) Continuation of application No. PCT/JP2022/011144, filed on Mar. 11, 2022.

(30) Foreign Application Priority Data

Jun. 29, 2021 (JP) .................................. 2021-107486

(51) Int. Cl.
*G06F 3/041* (2006.01)
*G01C 9/00* (2006.01)
*G06F 3/01* (2006.01)

(52) U.S. Cl.
CPC ............. *G06F 3/0414* (2013.01); *G01C 9/00* (2013.01); *G06F 3/016* (2013.01)

(58) Field of Classification Search
CPC ........... G06F 3/016; G06F 3/041–0416; G06F 3/044; G06F 2203/0381; G06F 2203/04104–04106; B60K 2360/143–1472

See application file for complete search history.

(56) References Cited

U.S. PATENT DOCUMENTS

| | | | |
|---|---|---|---|
| 11,449,154 B1 * | 9/2022 | Chu | G06F 3/044 |
| 2011/0102358 A1 * | 5/2011 | Aono | G06F 3/0414 |
| | | | 345/173 |
| 2011/0242035 A1 | 10/2011 | Nozawa et al. | |
| 2012/0262396 A1 * | 10/2012 | Jiyama | G06F 3/04142 |
| | | | 345/173 |

(Continued)

FOREIGN PATENT DOCUMENTS

| | | |
|---|---|---|
| JP | S62-147521 A | 7/1987 |
| JP | 2011-221675 A | 11/2011 |

(Continued)

OTHER PUBLICATIONS

International Search Report issued in the corresponding International Application No. PCT/JP2022/011144; mailed on May 24, 2022 (3 pages).

*Primary Examiner* — Keith L Crawley
(74) *Attorney, Agent, or Firm* — Harness, Dickey & Pierce, P.L.C.

(57) ABSTRACT

An input device including a panel that is held in a tiltable manner, a plurality of input operation sections that are disposed on the panel and that are capable of detecting a touch input operation, a pressure detector that detects pressure to the panel, and a pressing determination section that determines pressing based on a result of the pressure detection performed by the pressure detector, further includes a tilt detector that detects tilt of the panel.

20 Claims, 6 Drawing Sheets

(56) References Cited

U.S. PATENT DOCUMENTS

| | | | |
|---|---|---|---|
| 2015/0116205 A1* | 4/2015 | Westerman | G06F 3/04847 345/156 |
| 2017/0277385 A1* | 9/2017 | Müller | G06F 3/0488 |
| 2018/0239443 A1* | 8/2018 | Wakuda | G06F 3/03547 |
| 2018/0329498 A1* | 11/2018 | Takahashi | G06F 3/047 |
| 2019/0155446 A1* | 5/2019 | Hatano | G06F 3/0416 |
| 2021/0055810 A1* | 2/2021 | Wakuda | G06F 3/03547 |
| 2021/0252388 A1* | 8/2021 | VanWyk | G06F 3/0338 |
| 2022/0293376 A1* | 9/2022 | Stallein | G06F 3/016 |

FOREIGN PATENT DOCUMENTS

| | | |
|---|---|---|
| JP | 2016-62546 A | 4/2016 |
| JP | 2017-97444 A | 6/2017 |
| WO | 2017-073152 A1 | 5/2017 |
| WO | 2019-220749 A1 | 11/2019 |

* cited by examiner

INPUT DEVICE DETECTING A TOUCH INPUT OPERATION BASED ON A PANEL TILT ANGLE

CLAIM OF PRIORITY

This application is a Continuation of International Application No. PCT/JP2022/011144 filed on Mar. 11, 2022, which claims benefit of Japanese Patent Application No. 2021-107486 filed on Jun. 29, 2021. The entire contents of each application noted above are hereby incorporated by reference.

BACKGROUND OF THE INVENTION

1. Field of the Invention

The present invention relates to an input device.

2. Description of the Related Art

Japanese Unexamined Patent Application Publication No. 2012-68987 discloses a technique, which relates to an input device including a touch panel, for detecting a degree of acceleration generated on the touch panel by an accelerometer when the touch panel is pressed.

However, the technology described in Japanese Unexamined Patent Application Publication No. 2012-68987 may not determine a contact position when the contact position is pressed in a state in which a plurality of contact positions are simultaneously touched by finger tips on a touch panel.

SUMMARY OF THE INVENTION

The present invention provides an input device including a panel that is held in a tiltable manner, a plurality of input operation sections that are disposed on the panel and that are capable of detecting a touch input operation, a pressure detector that detects pressure to the panel, and a pressing determination section that determines pressing based on a result of the pressure detection performed by the pressure detector, further includes a tilt detector that detects tilt of the panel.

According to the embodiment, when the panel is pressed, a pressed position on the panel may be identified.

DESCRIPTION OF THE PREFERRED EMBODIMENTS

Hereinafter, an embodiment of the present invention will be described with reference to the accompanying drawings. Note that, in the description that follows, a Z-axis direction in the drawings is set as a vertical direction, an X-axis direction in the drawings is set as a front-back direction, and a Y-axis direction in the drawings is set as a lateral direction. Note that an X-axis positive direction is determined as a forward direction, a Y-axis positive direction is determined as a rightward direction, and a Z-axis positive direction is determined as an upward direction. These are indicative of the relative positional relationship within devices, and are not intended to limit installation directions or operation directions of the devices, and all equivalent relative positional relationships within the devices, even those in which the installation directions and the operation directions are different, are included in the scope of rights of the present invention.

Configuration of Input Device 100

Figure 1:
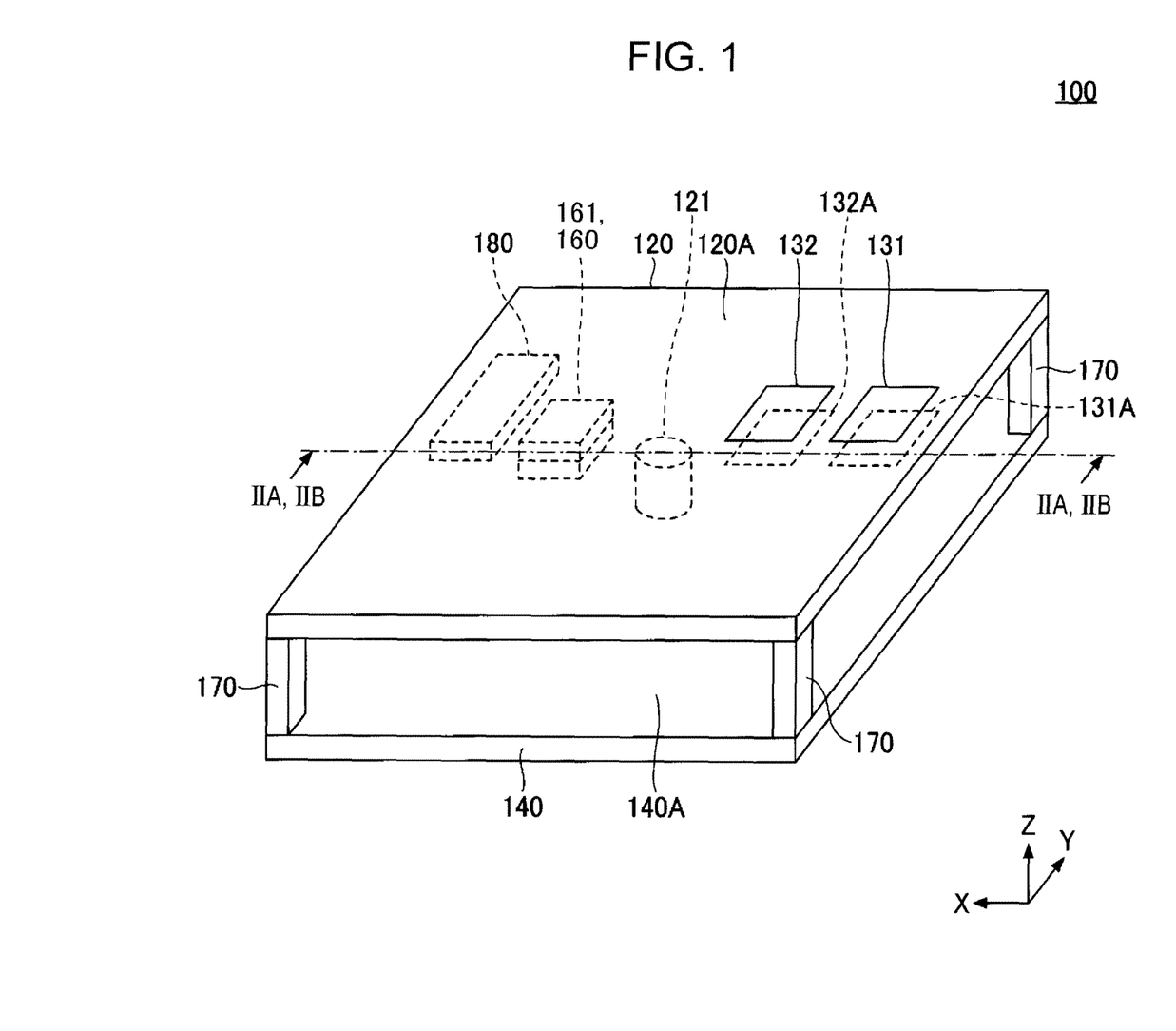
FIG. 1 is a perspective view of appearance of an input device according to an embodiment.
Figure 2A:
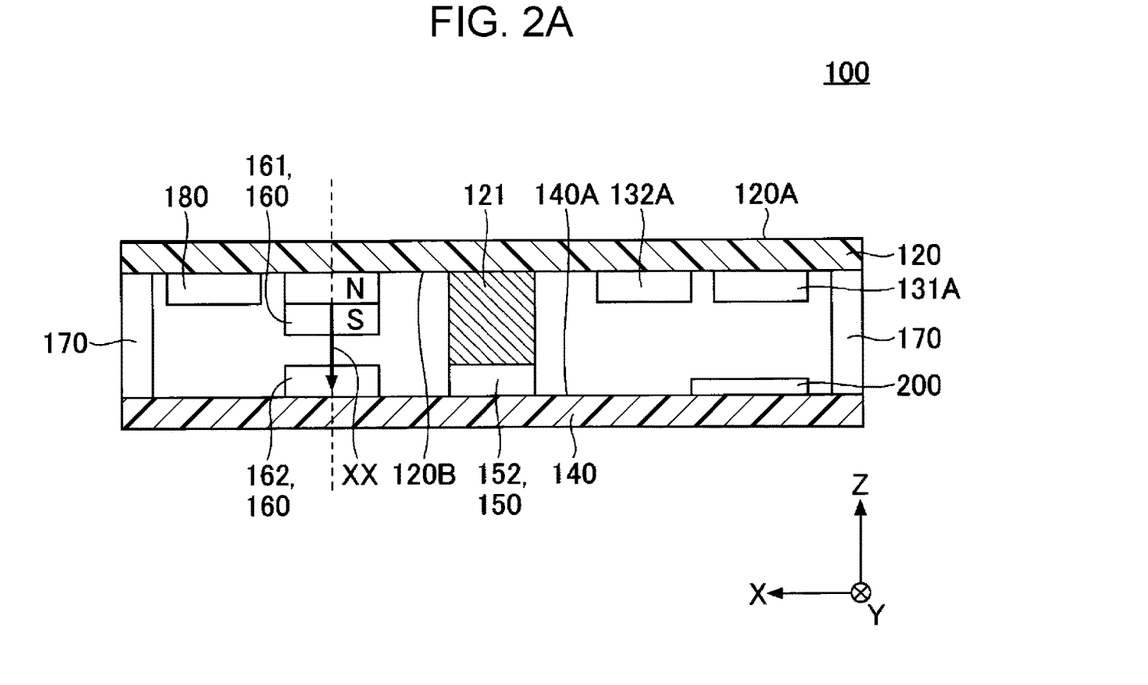
FIG. 2A is a cross-sectional view of a panel in a horizontal state along a line IIA to IIA according to the embodiment.
Figure 2B:
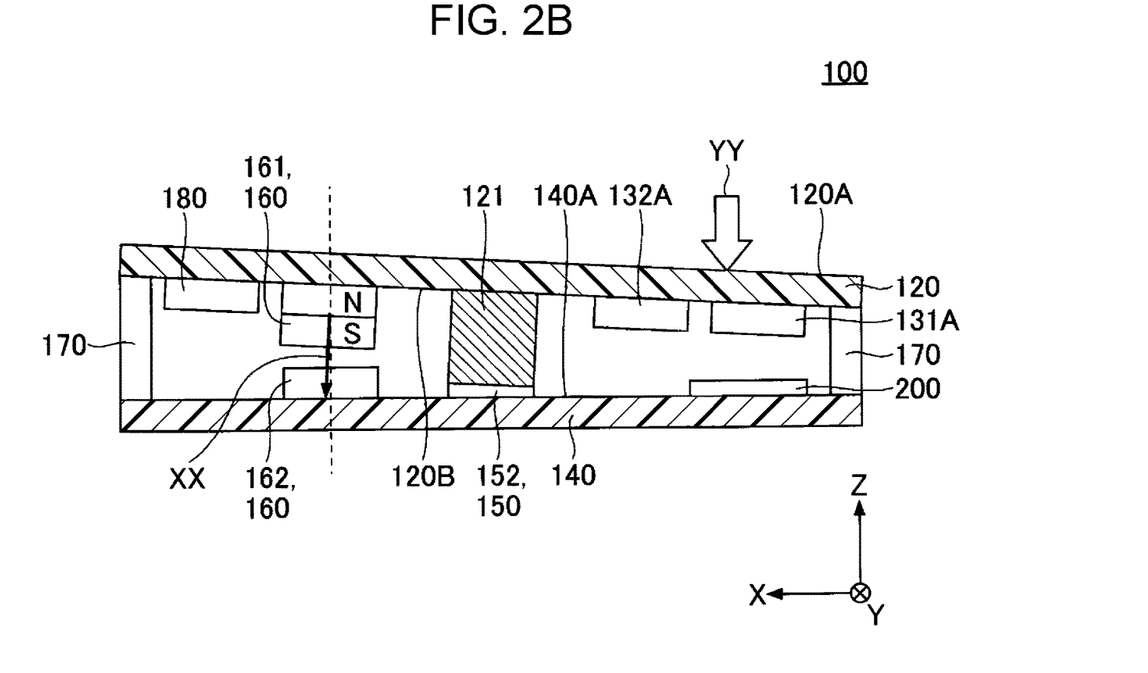
FIG. 2B is a cross-sectional view of the panel in a tilted state along the line IIB to IIB according to the embodiment.

FIG. 1 is a perspective view of appearance of an input device 100 according to an embodiment. FIGS. 2A and 2B are cross-sectional views of the input device 100 along lines IIA to IIA and IIB to IIB, respectively, (refer to FIG. 1) according to the embodiment. Note that a panel 120 is in a horizontal state without a pressing operation in FIG. 2A, and the panel 120 is in a tilted state with a pressing operation in FIG. 2B. The input device 100 illustrated in FIGS. 1, 2A, and 2B is mounted on a passenger compartment (e.g., a center console) of a vehicle, such as a car, for example, and is used to operate on-board devices, etc. The input device 100 has a thin rectangular shape. As shown in FIGS. 1, 2A, and 2B, the input device 100 includes a panel 120, a first button 131, a second button 132, a substrate 140, a pressure detector 150, a tilt detector 160, a damper 170, an actuator 180, and a control device 200.

The panel 120 is a member made of resin and in a form of a flat plate disposed at the top of the input device 100. The panel 120 has a rectangular shape in a plan view from above (Z-axis positive direction). However, the shape is not limited to this and the panel 120 may have any shape in plan view. Furthermore, in the panel 120, a front surface 120A may not limited to a planar shape, but the front surface 120A may have a curved shape.

The first button 131 and the second button 132 are disposed on the panel 120 so that a touch input operation is enabled from the front surface 120A side of the panel 120. The first button 131 and the second button 132 are examples of "a plurality of input operation sections". In this embodiment, the buttons 131 and 132 are arranged in the front and back direction (X-axis direction) at the right rear portion on the panel 120. The first button 131 and the second button 132 are used to operate specific functions (e.g., audio fast forward and rewind functions) possessed by an on-board device to be operated. Note that the first button 131 and the second button 132 are visible to the user since graphics or the like are printed on the front surface 120A or a back surface 120B of the panel 120. The first button 131 has an electrostatic sensor 131A on the back surface 120B of the panel 120. The electrostatic sensor 131A detects a contact of an operator (finger, etc.) relative to the first button 131 by a change in capacitance. Furthermore, the second button 132 also has an electrostatic sensor 132A on the back surface 120B of the panel 120. The electrostatic sensor 132A detects a contact of the operator on the second button 132 by a change in capacitance. The electrostatic sensors 131A and 132A output capacitance detection values to the control device 200.

The substrate 140 is a member made of resin and in a form of a flat plate disposed at a predetermined distance from the panel 120 at a bottom portion of the input device 100. For example, a printed wired board (PWB) is used for the substrate 140.

A plurality of dampers 170 are provided between the substrate 140 and the panel 120. The plurality of dampers 170 support the panel 120 with respect to the substrate 140 in a tiltable manner. For example, the dampers 170 are made of an elastic material, such as a spring or rubber, that can be expanded and contracted in the vertical direction (Z-axis direction) by elastic deformation. The plurality of dampers 170 maintain the panel 120 in a horizontal state by evenly urging the panel 120 upward (Z-axis positive direction) when the panel 120 is in an initial state that is not pressed (refer to FIG. 2A). When a position of the panel 120 shifted from the center of gravity is pressed (arrow mark YY), the plurality of dampers 170 may hold the panel 120 in a tilted state by expanding and contracting the respective dampers 170 in a manner corresponding to the pressed position (refer to FIG. 2B).

The pressure detector 150 detects a pressure to the panel 120. In this embodiment, a pressure sensor 152 is used as the pressure detector 150. The pressure sensor 152 is disposed on an upper surface 140A of the substrate 140 so as to face a pressure protrusion 121 which projects downward (in the Z-axis negative direction) from the back surface 120B of the panel 120. The pressure sensor 152 is an example of a "pressure detector" and detects a load applied to the pressure sensor 152 from the pressure protrusion 121 as a pressure load of the panel 120. Then, the pressure sensor 152 outputs a detection value of the pressure load of the panel 120 to the control device 200

The tilt detector 160 detects a tilt of the panel 120. Examples of a detection of a tilt of the panel 120 include a detection of a degree of a tilt angle of the panel 120 and a detection of a tilt direction of the panel 120. Only one of them may be detected or both may be detected. In this embodiment, the tilt detector 160 includes a magnet 161 and a magnetic sensor 162. The magnet 161 is fixedly disposed on the back surface 120B of the panel 120. The S and N poles of the magnet 161 are magnetized in the vertical direction, and in an initial state without tilt, a magnetic flux generated from the magnetic poles (schematically indicated by an arrow XX) is perpendicular to the opposing substrate 140 (refer to FIG. 2A). The magnetic sensor 162 faces the magnet 161 at the upper surface 140A of the substrate 140. The magnetic sensor 162 may detect the tilt of the panel 120 by detecting a change of one or both of the degree of the tilt angle and the direction of the tilt of the magnetic flux (arrow X) of the magnet 161 associated with the tilt of the panel 120 with respect to an initial state. The magnetic sensor 162 outputs the detected tilt value of the panel 120 to the control device 200 disposed on the upper surface 140A of the substrate 140. In this embodiment, a three-axis magnetic sensor, such as a magnetoresistive effect element, is used as the magnetic sensor 162, and therefore, a degree of the tilt angle and a direction of the tilt with respect to the X-axis direction and the Y-axis direction of the panel 120 may be individually detected with ease.

The actuator 180 is integrally disposed on the back surface 120B of the panel 120. For example, a solenoid or a piezoelectric element is used as an actuator 180. The actuator 180 is an example of a "vibration generator," which generates vibration when determining an input operation, etc., thereby imparting a vibrating tactile sensation to the panel 120 held in a vibration available manner by the dampers 170.

The control device 200 executes various processes in the input device 100. For example, the control device 200 detects a contact operation or a pressure operation performed on the first button 131 or the second button 132 based on information acquired from the sensors (electrostatic sensors 131A and 132A, the pressure sensor 152, and the magnetic sensor 162), and outputs an operation signal corresponding to the detected operation to an external section of the input device 100 (e.g., an in-vehicle device to be operated) and an actuator 180 via wiring or the like. The control device 200 is realized, for example, by a microcomputer. Note that the control device 200 may be disposed in a portion other than the upper surface 140A of the substrate 140. For example, the control device 200 may be provided outside the substrate 140 and connected to the substrate 140 via wiring or the like.

Functional Configuration of Control Device 200

Figure 3:
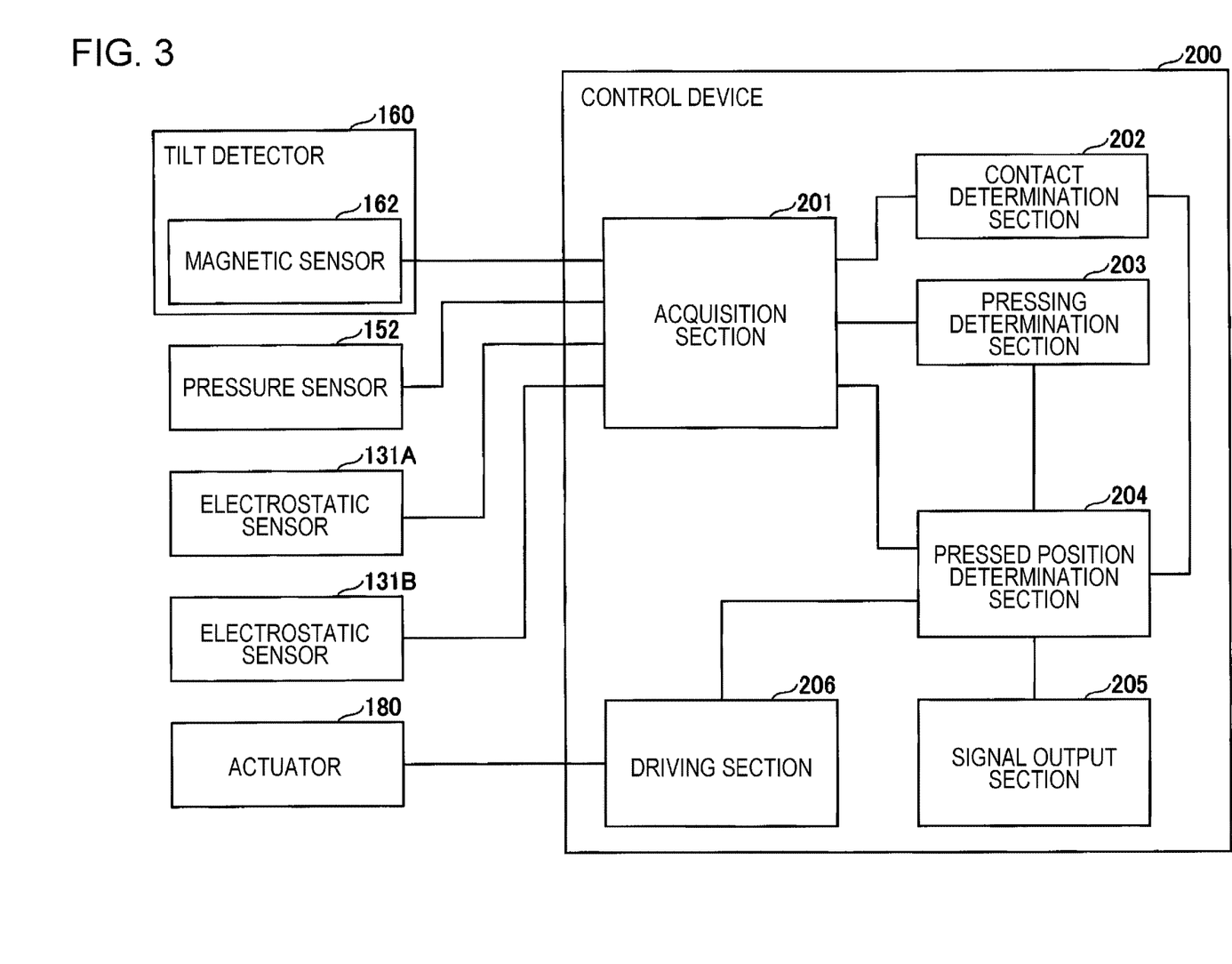
FIG. 3 is a diagram illustrating a functional configuration of a control device according to the embodiment.

FIG. 3 is a diagram illustrating a functional configuration of the control device 200 according to the embodiment. As illustrated in FIG. 3, the control device 200 includes an acquisition section 201, a contact determination section 202, a pressing determination section 203, a pressed position determination section 204, a signal output section 205, and a driving section 206.

The acquisition section 201 acquires detection values from the individual sensors (electrostatic sensors 131A and 132A, pressure sensor 152, magnetic sensor 162).

The contact determination section 202 determines whether the first button 131 and the second button 132 has been touched based on detection values of the electrostatic sensors 131A and 132A acquired by the acquisition section 201. For example, when the detection value (capacitive value) of the electrostatic sensor 131A exceeds a predetermined threshold value, the contact determination section 202 determines that the first button 131 has been touched. Similarly, when the detection value (capacitive value) of the electrostatic sensor 132A exceeds a predetermined threshold value, the contact determination section 202 determines that the second button 132 has been touched.

The pressing determination section 203 determines whether the panel 120 has been pressed based on a detection value of the pressure sensor 152 acquired by the acquisition section 201 For example, when the detection value of the pressure sensor 152 (i.e., a pressure load of the panel 120) exceeds a predetermined threshold value, the pressing determination section 203 determines that the panel 120 has been pressed.

When the pressing determination section 203 determines that the panel 120 has been pressed, the pressed position determination section 204 determines a position where the pressure has been applied on the panel 120 based on detection values of the electrostatic sensors 131A and 132A acquired by the acquisition section 201 and a detection value of the magnetic sensor 162 (that is, a result of detection of tilt of the panel 120 detected by the tilt detector 160) where appropriate.

For example, when it is determined that only one of the first button 131 and the second button 132 has been touched and the panel 120 has been pressed, the pressed position determination section 204 determines that a pressing operation has been performed on one of the first button 131 and the second button 132 which is determined to be touched.

Furthermore, for example, when it is determined that both the first button 131 and the second button 132 have been touched and it is determined that the panel 120 has been pressed, the pressed position determination section 204 may further determine one of the first button 131 and the second button 132 that has actually been pressed based on a detection value of the magnetic sensor 162 (i.e., a result of detection of tilt of the panel 120 by the tilt detector 160).

The signal output section 205 outputs an operation signal in accordance with an operation performed on the panel 120.

For example, when it is determined that the first button 131 has been touched, the signal output section 205 outputs an operation signal corresponding to the touch operation on the first button 131 to an outside (e.g., an in-vehicle device to be operated).

For example, when it is determined that the second button 132 has been touched, the signal output section 205 outputs an operation signal corresponding to the touch operation on the second button 132 to an outside (e.g., an in-vehicle device to be operated).

Furthermore, when it is determined that the first button 131 has been touched and the panel 120 has been pressed, for example, the signal output section 205 outputs an operation signal corresponding to the pressing operation on the first button 131 to an outside (e.g., an in-vehicle device to be operated).

Furthermore, when it is determined that the second button 132 has been touched and the panel 120 has been pressed, for example, the signal output section 205 outputs an operation signal corresponding to the pressing operation on the second button 132 to an outside (e.g., an in-vehicle device to be operated).

Furthermore, when it is determined that both the first button 131 and the second button 132 have been touched and the panel 120 has been pressed, the signal output section 205 outputs an operation signal in accordance with the pressing operation of one of the first button 131 and the second button 132 which is determined by the pressed position determination section 204 (i.e., the button actually pressed) to the outside (e.g., the in-vehicle device to be operated).

The driving section 206 provides a vibration tactile sensation to the panel 120 by driving the actuator 180 when the panel 120 is operated.

For example, when the first button 131 is operated, the driving section 206 may impart a vibration tactile sensation corresponding to the operation on the first button 131. In this case, the driving section 206 may impart different vibration tactile sensations for a contact operation and a press operation on the first button 131.

For example, when the second button 132 is operated, the driving section 206 may impart a vibration tactile sensation corresponding to the operation on the second button 132. In this case, the driving section 206 may impart different vibration tactile sensations for a contact operation and a press operation on the second button 132.

Note that, the control device 200 includes a CPU (Central Processing Unit), a ROM (Read Only Memory), and a RAM (Random Access Memory). The functions of the control device 200 are realized when the CPU executes programs stored in the ROM, for example, in the control device 200.

Procedure of Processing by Control Device 200

Figure 4:
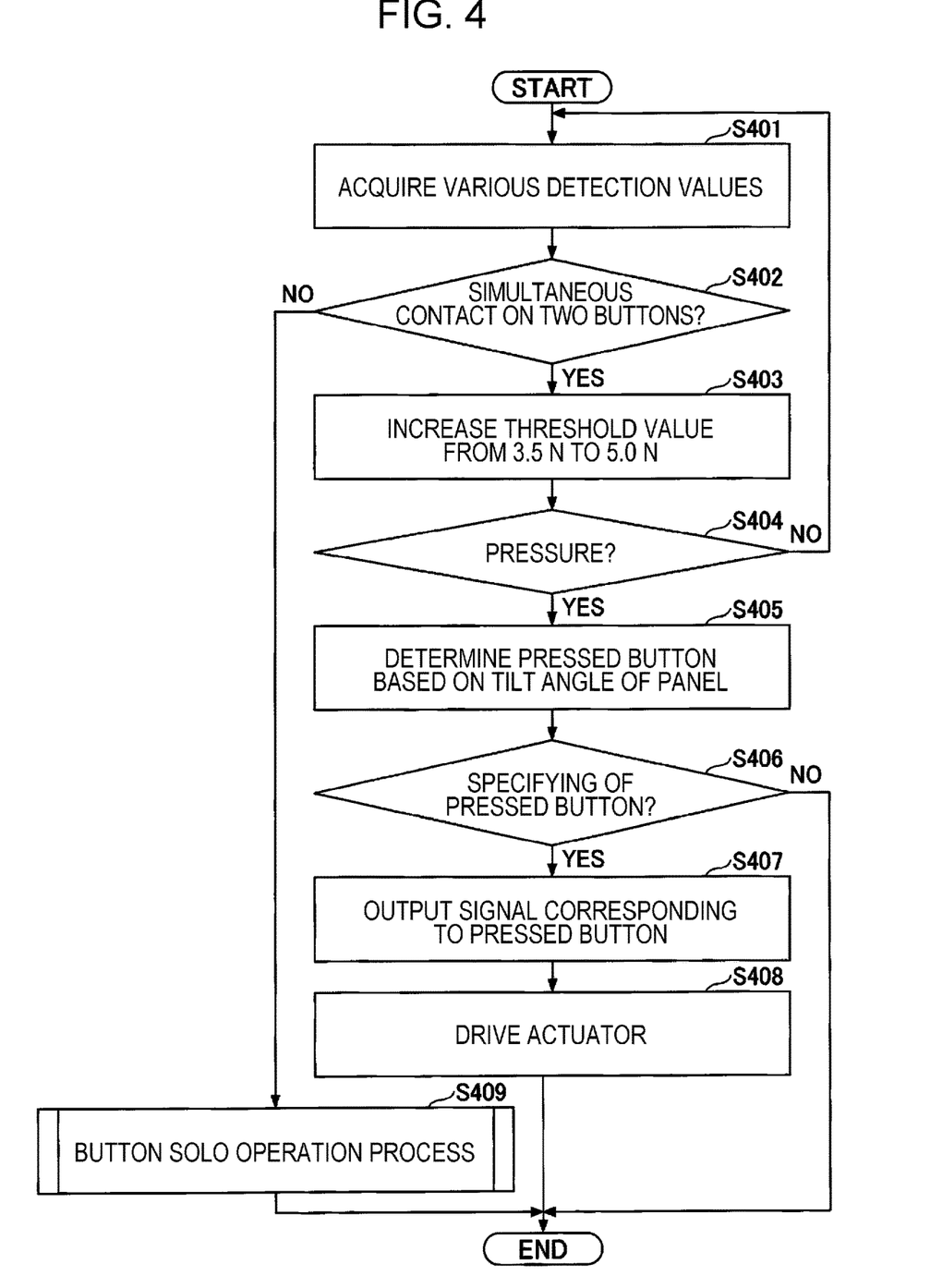
FIG. 4 is a flowchart of an example of a procedure of a process performed by the control device according to the embodiment.

FIG. 4 is a flowchart of an example of a procedure of a process performed by the control device 200 according to the embodiment.

First, the acquisition section 201 acquires detection values from the individual sensors (electrostatic sensors 131A and 132A, pressure sensor 152, and magnetic sensor 162) (step S401).

Next, the contact determination section 202 determines whether the first button 131 and the second button 132 have been simultaneously touched based on the detection values of the electrostatic sensors 131A and 132A acquired in step S401 (step S402).

When it is determined that the first button 131 and the second button 132 have not been simultaneously touched in step S402 (step S402: No), the control device 200 executes a button solo operation process (step S409), and terminates the series of processes illustrated in FIG. 4. The button solo operation process is performed in response to a contact operation or a pressing operation on one button, not illustrated, and a signal output and driving of the actuator 180 are performed in response to a contact operation or a pressing operation on one button, for example.

On the other hand, when it is determined that the first button 131 and the second button 132 have been simultaneously touched in step S402 (step S402: Yes), the pressing determination section 203 increases a threshold value for determining whether pressing has been performed from 3.5 [N] to 5.0 [N] (step S403). Then the pressing determination section 203 determines whether the panel 120 has been pressed based on the detection value acquired in step S401 by the pressure sensor 152 and the threshold value increased in step S403 (i.e., 5.0 [N]) (step S404).

In step S404, when it is determined that the panel 120 has not been pressed (step S404: No), the control device 200 returns the process to step S401. (However, the control device 200 terminates the series of processes illustrated in FIG. 4 when pressure is not detected even after repeating the process a predetermined number of times or for a predetermined period of time.)

On the other hand, in step S404, when it is determined that the panel 120 has been pressed (step S404: Yes), the pressed position determination section 204 determines one of the first button 131 and the second button 132 that has been actually pressed based on the detection value of the magnetic sensor 162 acquired in step S401 (i.e., the detection result of the tilt of the panel 120 acquired by the tilt detector 160) (step S405).

Next, the control device 200 determines whether the button subjected to the pressing operation has been identified by the determination process in step S405 (step S406).

In step S406, it is determined that the button subjected to the pressing operation is not identified (step S406: No), the control device 200 terminates the series of processes illustrated in FIG. 4.

On the other hand, in step S406, when it is determined that the button subjected to the pressing operation has been identified (step S406: Yes), the signal output section 205 outputs an operation signal corresponding to the pressing operation performed on the button identified to be subjected to the pressing operation to the outside (e.g., the on-board device to be operated) (step S407).

Note that it is determined that the button subjected to the pressing operation has not been identified when the first button 131 and the second button 132 are simultaneously pressed, for example. In this case, for example, the control device 200 may disable the pressing operation, and a predetermined button having high priority may be deemed to have been pressed.

Then, the driving section 206 drives the actuator 180 so as to impart a vibration tactile sensation to the panel 120 in accordance with the operation of pressing the button identified as having been pressed (step S408). Thereafter, the control device 200 terminates the series of processes illustrated in FIG. 4.

Example of Detection of Tilt of Panel 120

Figure 5:
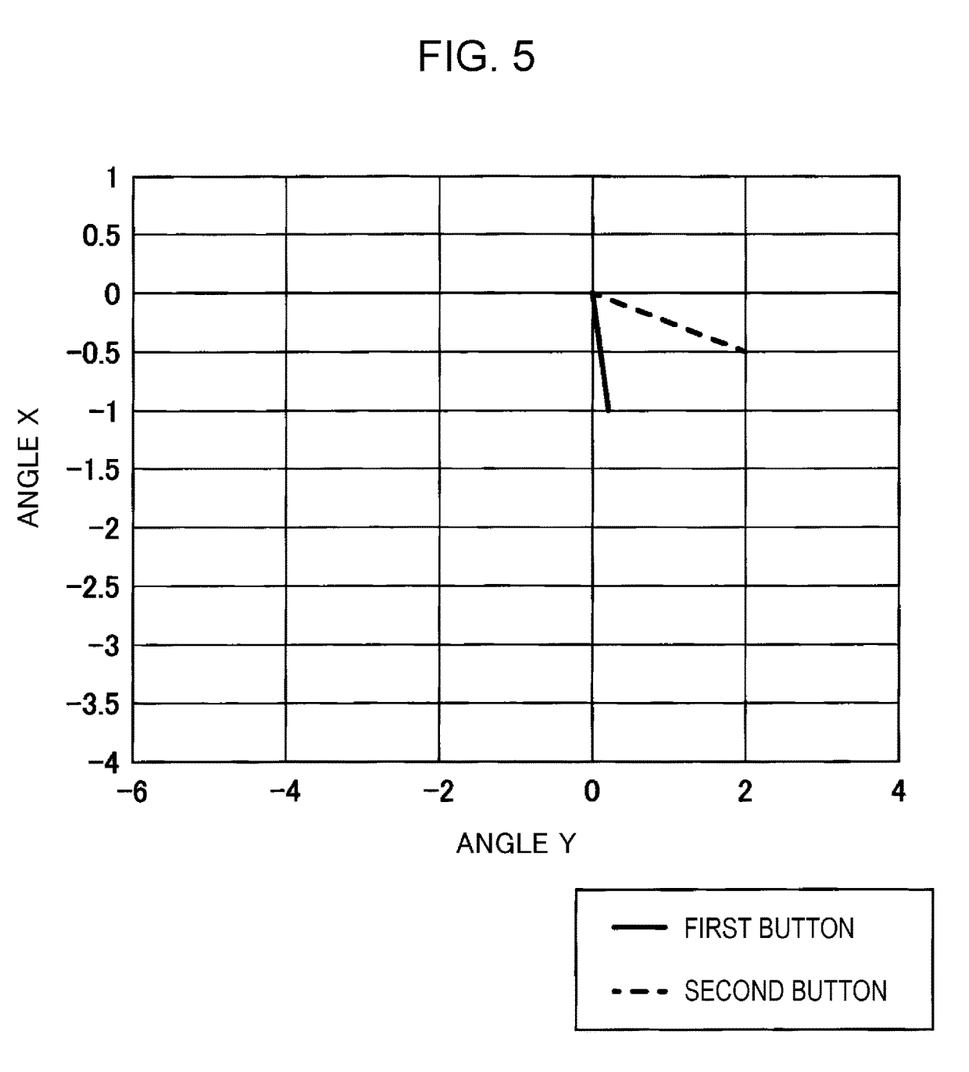
FIG. 5 is a diagram illustrating an example of a panel tilt detected by a tilt detector according to the embodiment.

FIG. 5 is a diagram illustrating an example of a tilt of the panel 120 detected by the tilt detector 160 according to the embodiment. FIG. 5 is a graph of a degree of a tilt angle in the X-axis direction of the magnetic flux (arrow XX) of the magnet 161 and a degree of a tilt angle in the Y-axis direction when the first button 131 and the second button 132 of the panel 120 are pressed to a predetermined threshold value.

Since a combination of the X and Y coordinates on the panel 120 is different between the first button 131 and the second button 132, a direction and a distance from an origin (position of the tilt detector 160) of the tilt of the panel 120 are different between the first button 131 and the second button 132. Therefore, as illustrated in FIG. 5, a detection result of the degree of the tilt angle relative to the X-axis direction and the degree of the tilt angle relative to the Y-axis direction of the panel 120 (magnetic flux (arrow XX) of the magnet 161) to be detected are different between when the first button 131 is pressed and when the second button 132 is pressed. Note that, in the control device 200, the relationship between all buttons that may be pressed on the panel 120 and degrees of tilt angles in the individual axis directions detected at a time of pressing are stored in an associated manner in the pressed position determination section 204.

The control device 200 according to the embodiment may detect a degree of a tilt angle of the panel 120 using the tilt detector 160. Then the control device 200 according to the embodiment may determine a button corresponding to the degree of the detected tilt angle as a pressed button. Furthermore, according to the detection result of FIG. 5, it is clear that, when different buttons are pressed, different tilt directions in the panel 120 are obtained, and the individual buttons and the tilt directions may be associated with each other as the correlations.

Therefore, when one of the first button 131 and the second button 132 is pressed while the fingertips simultaneously touch the first button 131 and the second button 132, the control device 200 according to the embodiment may determine a button that has been pressed.

Effect of Increasing Threshold Value

Figure 6:
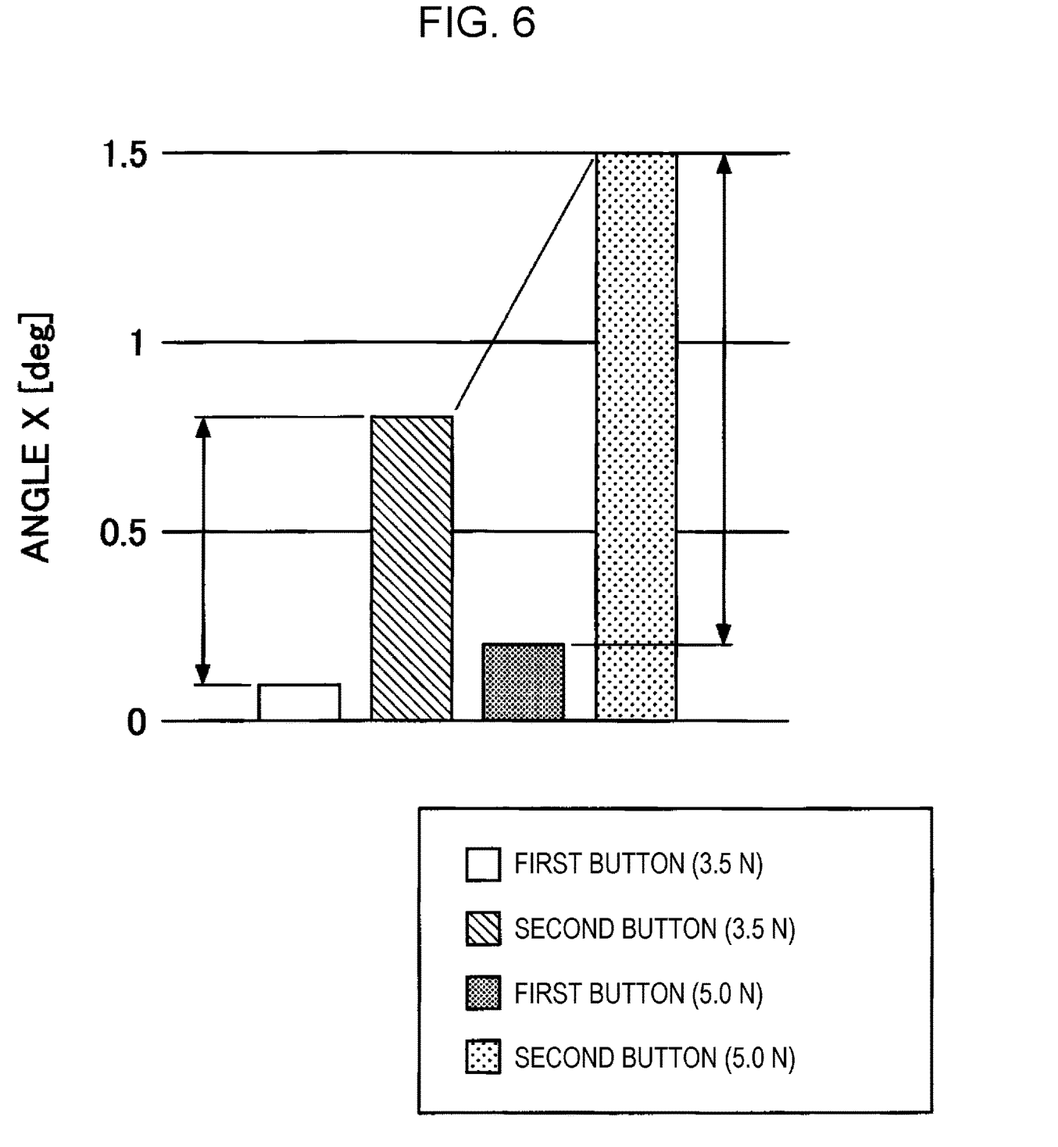
FIG. 6 is a diagram illustrating an effect of increase in a threshold value by the control device according to the embodiment.

FIG. 6 is a diagram showing an effect of increasing a threshold value by the control device 200 according to the embodiment. FIG. 6 is a graph illustrating tilt of the panel 120 when the first button 131 and the second button 132 are pressed with the threshold value (3.5 [N]) before change, i.e., at a time of a solo operation, and a threshold value (5.0 [N]) after the change, i.e., at a time of a simultaneous operation.

As shown in FIG. 6, the control device 200 according to the embodiment may amplify an angle difference between an angle of tilt of the panel 120 when pressure of the first button 131 is detected and an angle of tilt of the panel 120 when pressure of the second button 132 is detected by increasing the threshold value for determining the pressure by the pressing determination section 203 from 3.5 [N] to 5.0 [N].

Therefore, even when the first button 131 and the second button 132 are disposed in proximity to each other, the control device 200 according to the embodiment may discriminate the pressed button based on the tilt angle of the panel 120 with high accuracy.

As described above, the input device 100 according to the embodiment including the panel 120 that is held in a tiltable manner, the buttons 131 and 132 that are disposed on the panel 120 and that are capable of detecting a touch input operation, the pressure detector 150 that detects pressure to the panel 120, and the pressing determination section 203 that detects pressing based on a result of the pressure detection performed by the pressure detector 150, further includes the tilt detector 160 that detects tilt of the panel 120.

Therefore, the input device 100 according to the embodiment may identify a pressed position on the panel 120 based on tilt of the panel 120 when the panel 120 is pressed.

Furthermore, the input device 100 according to the embodiment further includes the pressed position determination section 204 that determines a pressed position on the panel 120 based on the tilt of the panel 120 detected by the tilt detector 160 when the pressing determination section 203 determines that the pressure has been applied.

As a result, the input device 100 according to the embodiment may identify a pressed position on the panel 120 based on the tilt of the panel 120 when the panel 120 is sufficiently pressed (to the extent that the pressing determination section 203 determines that pressure has been applied).

Furthermore, in the input device 100 according to the embodiment, the pressed position determination section 204 determines an input operation section that has been pressed from among the buttons 131 and 132 based on the tilt of the panel 120 detected by the tilt detector 160, when touch input operations are simultaneously detected on the buttons 131 and 132 and the pressing determination section 203 determines that pressure has been applied.

As a result, the input device 100 according to the embodiment may identify one of the buttons 131, 132 which has been pressed based on the tilt of the panel 120 when the panel 120 is sufficiently pressed in a state in which touch input operations are simultaneously performed on the buttons 131, 132.

Furthermore, in the input device 100 according to the embodiment, when pressure detected by the pressure detector 150 is higher than a predetermined threshold value, the pressing determination section 203 determines the pressure has been applied, and when touch input operations are simultaneously detected at the buttons 131 and 132, the predetermined threshold is increased.

By this, according to the input device 100 of the embodiment, even when the first button 131 and the second button 132 are disposed in proximity to each other, a pressed button may be discriminated with high accuracy based on a degree of the tilt angle of the panel 120.

Furthermore, in the input device 100 according to the embodiment, the tilt detector 160 includes the magnet 161 provided on the panel 120 side and the magnetic sensor 162, such as a magnetoresistive effect element, provided so as to face the magnet on the substrate 140 side.

As a result, the input device 100 according to the embodiment may easily detect a degree of a tilt angle of the panel 120 and a tilt direction with a relatively simple configuration. A pressed button may be discriminated with high accuracy by using one of or both the detection results of a tilt angle degree and a tilt direction.

Furthermore, in the input device 100 according to the embodiment, the buttons 131 and 132 use electrostatic sensors 131A and 132A, respectively.

As a result, the input device 100 according to the embodiment may detect contact with the buttons 131 and 132 with relatively high accuracy with a relatively simple configuration.

Also, in the input device 100 according to the embodiment, the pressure detector 150 uses the pressure sensor 152.

As a result, the input device 100 according to the embodiment may detect pressure to the panel 120 with relatively high accuracy with a relatively simple configuration.

In addition, the input device 100 according to the embodiment further includes the actuator 180 that imparts a vibrating tactile sensation to the panel 120.

As a result, the input device 100 according to the embodiment may tactilely present to an operator that a pressing operation has been reliably performed on the buttons 131 and 132.

Although the embodiment of the invention has been described above in detail, the present invention is not limited to the embodiment, and various modifications or changes may be made within the scope of the gist of the present invention described in the claims.

For example, although a plurality of positions touched on the panel 120 may be detected using a plurality of static sensors according to the embodiment, the present invention is not limited to this, and a plurality of positions touched on the panel 120 may be detected using a single electrostatic detect. Specifically, the "plurality of input operation sections" may be physically realized by a plurality of electrostatic sensors, or may be physically realized by a single electrostatic sensor. In the latter case, a plurality of regions in one electrostatic sensor correspond to "the plurality of input operation sections".

In addition, although the pressure sensor 152 is used as an example of the "pressure detector" according to the embodiment, the present invention is not limited to this and other sensor (e.g., displacement sensor) capable of detecting at least pressure to the panel 120 may be used as the "pressure detector."

In addition, although the magnet 161 and the magnetic sensor 162 are used as examples of the "tilt detector" according to the embodiment, the present invention is not limited to this and other configurations capable of detecting at least tilt of the panel 120 may be used as the "tilt detector."

Furthermore, although the electrostatic sensors 131A and 132A are used as examples of an "input detector" according to the embodiment, the present invention is not limited to this and other configurations capable of detecting at least a touch input operation may be used as the "input detector."

Furthermore, although a button pressed from among two buttons disposed on the panel 120 is determined based on tilt of the panel 120, the present invention is not limited to this and a pressed button may be determined from among three or more buttons disposed on the panel 120 based on the tilt of the panel 120.

Although the pressure sensor 152 that detects a load is used as an example of a "pressure detector" in this embodiment, and therefore, a threshold value for the load is used for a pressure determination, the present invention is not limited to this. For example, when a displacement sensor that detects a distance is used as the "pressure detector," a threshold value for a distance may be used for the pressure determination. In addition, when the displacement sensor that detects a distance is used as the "pressure detector," a threshold value for the load may be used for the pressure determination after converting the detected distance into a load.

This international application claims priority based on Japanese Patent Application No. 2021-107486 filed on Jun. 29, 2021, and the entire contents of the application are hereby incorporated herein by reference.

What is claimed is:

1. An input device comprising:
   a panel that is held in a tiltable manner, the panel having first and second edges that are outwardly opposite to each other with respect to a linear line passing along a center area of the panel, the panel being divided into first and second areas in a plan view, the first area being located between the center area and the first edge, the second area being located between the center area and the second edge;
   a plurality of buttons disposed on only a surface of the first area of the panel, the plurality of buttons having a plurality of electrostatic sensors, respectively, each of the plurality of electrostatic sensors being configured to detect a touch input operation with respect to a corresponding button of the plurality of buttons;
   a pressure detector having a single pressure senor, the single pressure senor being configured to detect a pressure to the panel due to the touch input operation, the single pressure sensor being located at the center area of the panel;
   a pressing determination section configured to determine whether the pressure is applied based on a detection result of the single pressure sensor and a detection result of each of the plurality of electrostatic sensors;
   a tilt detector configured to detect a degree of a tilt angle of the panel due to the touch input operation, the tilt detector being located at only the second area of the panel; and
   a pressed position determination section configured to:
      store reference data relating to a relationship between the degree of the tilt angle of the panel and each of the plurality of buttons when each of the plurality of buttons is pressed in advance; and
      determine one of the plurality of buttons as a pressed button based on the detected degree of the tilt angle of the panel by the tilt detector and the reference data when pressing determination section determines that the pressure is applied,
   wherein one button of the plurality of buttons is disposed closer to the first edge than another button of the plurality of buttons.

2. The input device according to claim 1,
   wherein, when two or more of the plurality of buttons are simultaneously operated, the plurality of electrostatic sensors are configured to simultaneously detect touch input operations, and
   the pressed position determination section is further configured to determine a pressed one of the plurality of buttons based on the detected degree of the tilt angle of the panel by the tilt detector when the touch input operations are simultaneously detected at the two or more of the plurality of buttons and the pressing determination section determines that the pressure is applied.

3. The input device according to claim 2, wherein
   the pressing determination section is further configured to:
      determine that the pressure is applied when the detected pressure by the pressure detector is higher than a predetermined threshold value; and
      increase the predetermined threshold value when the touch input operations are simultaneously detected at the plurality of buttons.

4. The input device according to claim 1, further comprising:
   a substrate disposed at a distance from the panel, wherein the tilt detector includes
      a magnet disposed on the panel, and
      a magnetic sensor disposed on the substrate so as to face the magnet.

5. The input device according to claim 1, wherein
the tilt detector includes a single magnet, and
the tilt detector is configured to detect a tilt angle and a tilt direction of a magnetic flux of the single magnet to detect the degree of the tilt angle of the panel due to the touch input operation.

6. The input device according to claim 1, further comprising a vibration generator configured to impart a vibration tactile sensation to the panel.

7. An input device comprising:
a panel that is held in a tiltable manner, the panel having first and second edges that are outwardly opposite to each other with respect to a linear line passing along a center area of the panel, the panel being divided into first and second areas in a plan view, the first area being located between the center area and the first edge, the second area being located between the center area and the second edge;
a plurality of buttons disposed on only a surface of the first area of the panel, the plurality of buttons being configured to detect a touch input operation;
a pressure detector configured to detect a pressure to the panel due to the touch input operation, the pressure detector being located at the center area of the panel;
a pressing determination section configured to determine whether the pressure is applied based on a detection result of the pressure detector;
a tilt detector including a single magnet, the tilt detector being configured to detect a tilt angle and a tilt direction of a magnetic flux of the single magnet to detect a degree of a tilt angle of the panel due to the touch input operation, the tilt detector being located at only the second area of the panel; and
a pressed position determination section configured to:
store data relating to a relationship between the degree of the tilt angle of the panel and each of the plurality of buttons when each of the plurality of buttons is pressed in advance; and
determine one of the plurality of buttons as a pressed button based on the detected degree of the tilt angle of the panel by the tilt detector when pressing determination section determines that the pressure is applied,
wherein one button of the plurality of buttons is disposed closer to the first edge than another button of the plurality of buttons.

8. The input device according to claim 7,
wherein, when two or more of the plurality of buttons are simultaneously operated, the plurality of buttons are configured to simultaneously detect touch input operations, and
the pressed position determination section is further configured to determine a pressed one of the plurality of buttons based on the detected degree of the tilt angle of the panel by the tilt detector when the touch input operations are simultaneously detected at the two or more of the plurality of buttons and the pressing determination section determines that the pressure is applied.

9. The input device according to claim 8, wherein
the pressing determination section is further configured to:
determine that the pressure is applied when the detected pressure by the pressure detector is higher than a predetermined threshold value; and
increase the predetermined threshold value when the touch input operations are simultaneously detected at the plurality of buttons.

10. The input device according to claim 7, further comprising:
a substrate disposed at a distance from the panel, wherein the tilt detector includes:
the single magnet disposed on the panel; and
a magnetic sensor disposed on the substrate so as to face the single magnet, and the magnetic sensor is configured to detect the tilt angle and the tilt direction of the magnetic flux of the single magnet.

11. The input device according to claim 7, wherein each of the plurality of buttons includes an electrostatic sensor.

12. The input device according to claim 7, wherein the pressure detector includes a pressure sensor.

13. The input device according to claim 7, wherein the pressure detector includes a displacement sensor.

14. The input device according to claim 7, further comprising a vibration generator configured to impart a vibration tactile sensation to the panel.

15. An input device comprising:
a panel that is held in a tiltable manner;
a plurality of buttons disposed on the panel, the plurality of buttons having a plurality of electrostatic sensors, respectively, each of the plurality of electrostatic sensors being configured to detect a touch input operation with respect to a corresponding button of the plurality of buttons, the plurality of buttons including first and second buttons directly adjacent to each other, the first and second buttons being configured to be operated as complementary operation functions of the touch input operation, respectively;
a pressure detector having a single pressure sensor, the single pressure sensor being configured to detect a pressure to the panel due to the touch input operation;
a pressing determination section configured to determine whether the pressure is applied based on a detection result of the single pressure sensor and a detection result of each of the plurality of electrostatic sensors, the plurality of electrostatic sensors including first and second electrostatic sensors that correspond to the first and second buttons;
a tilt detector configured to detect a degree of a tilt angle of the panel due to the touch input operation; and
a pressed position determination section configured to:
store reference data relating to a relationship between the degree of the tilt angle of the panel and each of the plurality of buttons when each of the plurality of buttons is pressed in advance; and
determine one of the plurality of buttons as a pressed button based on the detected degree of the tilt angle of the panel by the tilt detector and the reference data when pressing determination section determines that the pressure is applied,
wherein, when the first and second buttons are simultaneously operated, the first and second electrostatic sensors are configured to simultaneously detect touch input operations, and
the pressed position determination section is further configured to determine a pressed one of the first and second buttons based on the detected degree of the tilt angle of the panel by the tilt detector when the touch input operations are simultaneously detected at the first and second buttons and the pressing determination section determines that the pressure is applied.

16. The input device according to claim 15, wherein
the complementary operation functions of the first and
second buttons are an audio fast forward function and
an audio rewind function, respectively, as the touch
input operation.

17. The input device according to claim 15, wherein
the pressing determination section is further configured
to:
determine that the pressure is applied when the detected
pressure by the pressure detector is higher than a
predetermined threshold value; and
increase the predetermined threshold value when the
touch input operations are simultaneously detected at
the plurality of buttons.

18. The input device according to claim 15, further
comprising:
a substrate disposed at a distance from the panel, wherein
the tilt detector includes
a magnet disposed on the panel, and
a magnetic sensor disposed on the substrate so as to
face the magnet.

19. The input device according to claim 15, wherein
the tilt detector includes a single magnet, and
the tilt detector is configured to detect a tilt angle and a tilt
direction of a magnetic flux of the single magnet to
detect the degree of the tilt angle of the panel due to the
touch input operation.

20. The input device according to claim 15, further
comprising a vibration generator configured to impart a
vibration tactile sensation to the panel.

* * * * *